United States Patent
Hirose et al.

(10) Patent No.: US 12,304,973 B2
(45) Date of Patent: *May 20, 2025

(54) POLYSACCHARIDE DERIVATIVE PRODUCTION METHOD AND LIGNIN DERIVATIVE PRODUCTION METHOD

(71) Applicant: NATIONAL UNIVERSITY CORPORATION KANAZAWA UNIVERSITY, Kanazawa (JP)

(72) Inventors: Daisuke Hirose, Kanazawa (JP); Samuel Budi Wardhana Kusuma, Kanazawa (JP); Chie Maruyama, Kanazawa (JP); Naoki Wada, Kanazawa (JP); Kenji Takahashi, Kanazawa (JP)

(73) Assignee: NATIONAL UNIVERSITY CORPORATION KANAZAWA UNIVERSITY, Kanazawa (JP)

( * ) Notice: Subject to any disclaimer, the term of this patent is extended or adjusted under 35 U.S.C. 154(b) by 849 days.

This patent is subject to a terminal disclaimer.

(21) Appl. No.: 17/430,162

(22) PCT Filed: Mar. 5, 2020

(86) PCT No.: PCT/JP2020/009465
§ 371 (c)(1),
(2) Date: Aug. 11, 2021

(87) PCT Pub. No.: WO2020/184384
PCT Pub. Date: Sep. 17, 2020

(65) Prior Publication Data
US 2022/0153877 A1    May 19, 2022

(30) Foreign Application Priority Data
Mar. 8, 2019  (JP) .................. 2019-043063

(51) Int. Cl.
*C08B 3/10*    (2006.01)

(52) U.S. Cl.
CPC .................. *C08B 3/10* (2013.01)

(58) Field of Classification Search
CPC .................. C08B 3/10; C08B 3/00
See application file for complete search history.

(56) References Cited

U.S. PATENT DOCUMENTS 10,323,101 B2    6/2019  Kakuchi
2018/0022832 A1*  1/2018  Kakuchi ............ C08B 11/00
                                                      530/505

FOREIGN PATENT DOCUMENTS

DE    102006042892 A1    3/2008
WO    2016068053 A1    5/2016

OTHER PUBLICATIONS

Machine Translation of WO2016/068053A1 (Year: 2016).*
Kurnia, K., Sintra, T. E., Yann Danten, Maria Isabel Cabaço, Besnard, M., & Joao A.P. Coutinho. A simple method for preparation of a novel hydrophobic ionic liquid with a per-fluoro-tert-butoxide anion. New Journal of Chemistry, 41(1), 47-50. https://doi.org/10.1039/c6nj02575g (Year: 2017).*
Lopes et al. Ionic Liquid as Reaction Media for the Production of Cellulose-Derived Polymers from Cellulosic Biomass. ChemEngineering, 1(2), 10-10. https://doi.org/10.3390/chemengineering1020010 (Year: 2017).*
Office Action for Corresponding German Patent Application No. 112020001140.2, Sep. 30, 2022, 6 pages.
International Search Report for Corresponding International Application No. PCT/JP2020/009465 (3 Pages) (May 26, 2020).

* cited by examiner

*Primary Examiner* — Yih-Horng Shiao
*Assistant Examiner* — Hoi Yan Lee
(74) *Attorney, Agent, or Firm* — Lucas & Mercanti, LLP

(57) ABSTRACT

An object of the present invention is to provide a method for producing a polysaccharide derivative in which the use of a reagent such as an acid catalyst is not needed and a reaction can be smoothly progressed without causing any side reactions. A method for producing a polysaccharide derivative of the present invention includes a step of dissolving a raw material including a polysaccharide in at least one ionic liquid having an anion which is a non-carboxylate anion and reacting the raw material with an acyl group donor, a conjugate acid of the anion having a pKa of 4 or higher in vacuum.

4 Claims, No Drawings

POLYSACCHARIDE DERIVATIVE PRODUCTION METHOD AND LIGNIN DERIVATIVE PRODUCTION METHOD

CROSS-REFERENCE TO RELATED APPLICATIONS

This application is a 371 of PCT/JP2020/009465, filed Mar. 5, 2020, which claims the benefit of Japanese Patent Application No. 2019-043063, filed Mar. 8, 2019.

TECHNICAL FIELD

The present invention relates to a method for producing a polysaccharide derivative and a method for producing a lignin derivative.

BACKGROUND ART

Cellulose derivatives such as cellulose acetate are useful as thermoplastic materials. A variety of studies are underway regarding methods for producing polysaccharide derivatives such as cellulose derivatives described above. As conventional method for producing a polysaccharide derivative, known are classical esterification methods in which cellulose and an esterification agent are reacted under intense conditions in the presence of an acid catalyst. In these methods, there has been a problem in that decomposition of cellulose during the reaction decreases the degree of polymerization and decreases the mechanical strength of a cellulose derivative to be obtained.

In addition, lignin is a polymer composed of an aromatic compound and is a major component that forms plant cell walls together with polysaccharides (cellulose and hemicellulose). Lignin is obtained as a by-product of paper and pulp production processes or bioethanol production processes and mainly in use as a fuel only, and the industrial use of lignin is not becoming widespread at the moment.

In contrast, (Patent Literature 1) discloses a method for producing a polysaccharide derivative or lignin derivative in which a reaction is carried out in a mixture containing a raw material including a polysaccharide or lignin, an ionic liquid having an anion whose conjugate acid has a pKa of 12 to 19 in DMSO and capable of generating carbene, and a chain or cyclic ester compound.

According to the production method of (Patent Literature 1), it is possible to efficiently obtain a polysaccharide derivative or lignin derivative composed of an ester compound using a polysaccharide such as cellulose or lignin as a raw material without separately using a catalyst.

CITATION LIST

Patent Literature

Patent Literature 1: PCT International Publication No. WO 2016/068053

SUMMARY OF INVENTION

Technical Problem

The production method of (Patent Literature 1) is an excellent technique in terms of the fact that no catalyst is separately used, but there has been a problem in that a side reaction in which a structure derived not from the chain or cyclic ester compound but from the anion of the ionic liquid as in the following formula is contained by accident in a modified portion such as cellulose takes place. For example, there has been a report that, in a case where celluose and vinyl 2-ethylhexanoate are reacted in the presence of 1-ethyl-3-methylimidazolium acetate (EmimOAc) as an ionic liquid, out of the total degree of substitution (DS) (1.1) of a hydroxyl group of the cellulose, 0.2 (18.1%) is an ionic liquid-derived structure (L. P. Hinner, et al., Green Chem., 2016, 18, 6099-6107).

[Formula 1]

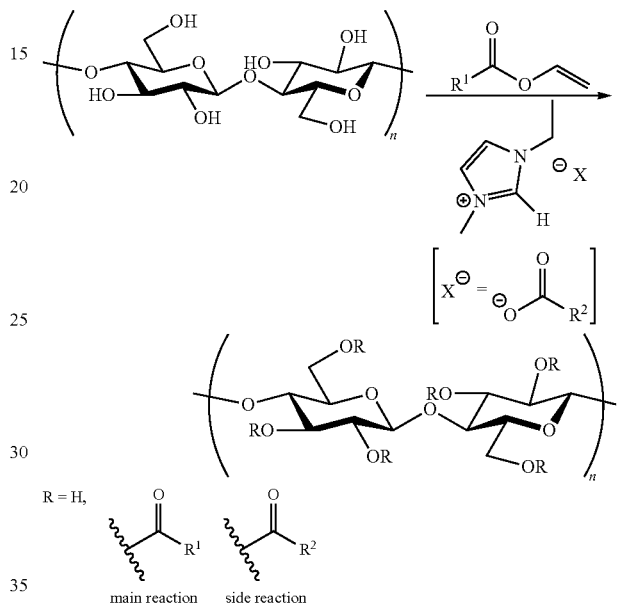

Therefore, an object of the present invention is to provide a method for producing a polysaccharide derivative or lignin derivative in which the use of a reagent such as an acid catalyst is not needed and a reaction can be smoothly progressed without causing any side reactions.

Solution to Problem

As a result of intensive efforts, the present inventors found that the above-problem is solved by dissolving a raw material including a polysaccharide or lignin in a specific ionic liquid in which an anion is not a carboxylate anion and reacting the solution with an acyl group donor such as an ester compound, and they have completed the invention. More specifically, the gist of the present invention is as described below.

(1) A method for producing a polysaccharide derivative, comprising a step of dissolving a raw material comprising a polysaccharide in at least one ionic liquid having an anion which is a non-carboxylate anion and reacting the raw material with an acyl group donor, a conjugate acid of the anion having a pKa of 4 or higher in vacuum.

(2) The method for producing a polysaccharide derivative according to (1), wherein the anion is at least one selected from the group consisting of a substituted or unsubstituted phenolate, a substituted or unsubstituted pyridinolate, a substituted or unsubstituted pyrimidinolate, substituted or unsubstituted 2,6-dioxo-1,2,3,6-tetrahydropurin-7-ide, substituted or unsubstituted imidazol-1-ide and 1,1,1,3,3,3-hexafluoro-2-(trifluoromethyl)propan-2-olate.

(3) The method for producing a polysaccharide derivative according to (1), wherein the anion is at least one selected from the group consisting of the following formulae:

[Formula 2]

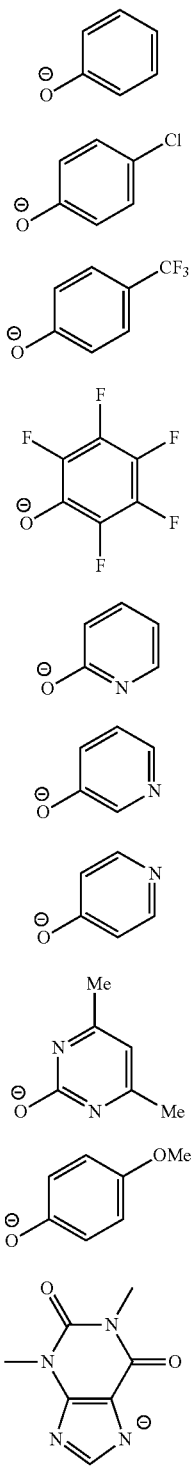

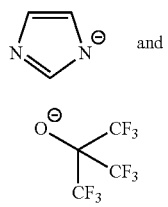

(4) The method for producing a polysaccharide derivative according to any one of (1) to (3), wherein the polysaccharide is cellulose.

(5) The method for producing a polysaccharide derivative according to any one of (1) to (4), wherein the acyl group donor is a chain or cyclic ester, an aldehyde, a carboxylic acid halide or a carboxylic acid anhydride.

(6) A method for producing a lignin derivative, comprising a step of dissolving a raw material comprising lignin in at least one ionic liquid having an anion which is a non-carboxylate anion and reacting the raw material with an acyl group donor, a conjugate acid of the anion having a pKa of 4 or higher in vacuum.

(7) The method for producing a lignin derivative according to (6), wherein the anion is at least one selected from the group consisting of a substituted or unsubstituted phenolate, a substituted or unsubstituted pyridinolate, a substituted or unsubstituted pyrimidinolate, substituted or unsubstituted 2,6-dioxo-1,2,3,6-tetrahydropurin-7-ide, substituted or unsubstituted imidazol-1-ide and 1,1,1,3,3,3-hexafluoro-2-(trifluoromethyl)propan-2-olate.

(8) The method for producing a lignin derivative according to (6), wherein the anion is at least one selected from the group consisting of the following formulae:

[Formula 3]

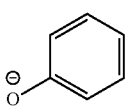

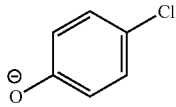

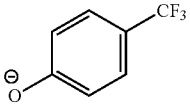

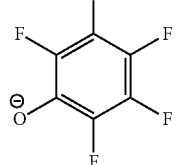

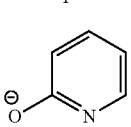

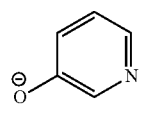
(6)

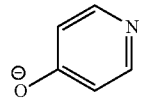
(7)

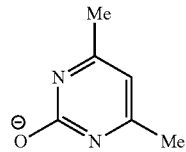
(8)

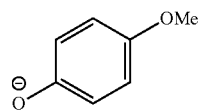
(9)

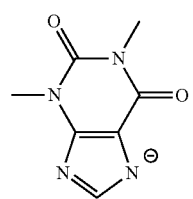
(10)

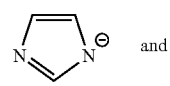 and
(11)

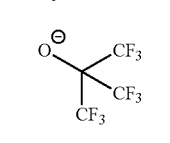
(12)

(9) The method for producing a lignin derivative according to any one of (6) to (8), wherein the acyl group donor is a chain or cyclic ester, an aldehyde, a carboxylic acid halide or a carboxylic acid anhydride.

The present specification includes the content disclosed by Japanese Patent Application No. 2019-043063 that is the basis of the priority of the present application.

Advantageous Effects of Invention

In the method for producing a polysaccharide derivative or lignin derivative of the present invention, the use of an acid catalyst or the like is not needed, and thus it is possible to hold a high mechanical strength of a derivative to be obtained. Therefore, it is possible to provide useful thermoplastic materials. In addition, it is possible to efficiently obtain an intended product in accordance with the acyl group donor without causing a side reaction in which an ionic liquid-derived structure is introduced into the product.

DESCRIPTION OF EMBODIMENTS

Hereinafter, the present invention will be described in detail based on embodiments.

First, a method for producing a polysaccharide derivative will be described. The method for producing a polysaccharide derivative according to the present embodiment includes a step of dissolving a raw material including a polysaccharide in a specific ionic liquid to react the raw material with an acyl group donor.

As the polysaccharide, a variety of polysaccharides are applicable, and examples thereof include cellulose, hemicellulose, starch, agarose, pectin, chitin, chitosan and the like. In these polysaccharides, apart of the structure may be substituted. For example, it is possible to use a cellulose derivative in which some of hydroxyl groups in cellulose are esterified as the raw material.

In addition, as the raw material including a polysaccharide, a natural material containing a polysaccharide such as cellulose as a mixture may also be used. Specific examples of such a material include wood such as bagasse (sugarcane residue), bamboo (bamboo powder), kenaf, Japanese cedar or *eucalyptus*, a gingko nun, a mixture of two or more thereof and the like. On these natural materials, a variety of pretreatments such as cutting and drying can be carried out as necessary prior to the reaction of the present embodiment.

An ionic liquid that is applicable to the present embodiment is at least one ionic liquid having an anion which is a non-carboxylate anion, a conjugate acid of the anion having a pKa of 4 or higher in vacuum. As the pKa, it is possible to use a calculated value by Advanced Chemistry Development (ACD/Laboratories) Software, version 11.02 (1994-2011 ACD/Laboratories). This ionic liquid is used as a solvent that dissolves the polysaccharide such as cellulose in the derivatization reaction of the present embodiment and functions as a strong organic molecular catalyst.

The type of a cation of the ionic liquid is not particularly limited and can be appropriately selected from a variety of known cations of the prior art such as an azolium ion, an ammonium ion and a pyridinium ion. Among these, the azolium ion is suitable as a solvent of the derivatization reaction of the present embodiment and is preferably used. The azolium ion is a cation having a five-membered heterocycle containing a nitrogen atom, and specifically, an imidazolium ion, a triazolium ion, a tetrazolium ion and the like are applicable. Examples of the triazolium ion include ions of 1-methyltriazolium, 1-ethyltriazolium, 1-propyltriazolium and 1-butyltriazolium and the like. In addition, examples of the tetrazolium ion include a 1-butyl-3-methyltetrazolium ion and the like.

As the azolium ion, an imidazolium ion represented by Formula (I) is preferably used since the reaction efficiency is excellent and the cost is low.

[Formula 4]

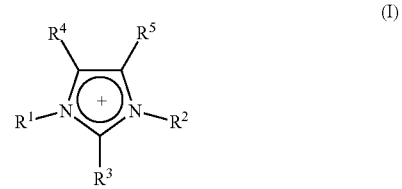
(I)

(In Formula (I), $R^1$ and $R^2$ are each independently an alkyl group, an alkenyl group, an alkoxyalkyl group or a substituted or unsubstituted phenyl group, and $R^3$ to $R^5$ are each independently hydrogen, an alkenyl group, an alkoxyalkyl group or a substituted or unsubstituted phenyl group.)

Examples of the alkyl group include linear or branched alkyl groups having 1 to 20 carbon atoms such as a methyl group, an ethyl group, an n-propyl group, an isopropyl group, a butyl group, a hexyl group and an octyl group. A sulfo group may bond to terminals of these alkyl groups. In addition, examples of the alkenyl group include linear or branched alkenyl groups having 1 to 20 carbon atoms such as a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group and a 1-octenyl group. In addition, examples of the alkoxyalkyl group include linear or branched alkoxyalkyl groups having 2 to 20 carbon atoms such as a methoxymethyl group, an ethoxymethyl group, a 1-methoxyethyl group, a 2-methoxyethyl group, a 1-ethoxyethyl group and a 2-ethoxyethyl group. Furthermore, examples of the substituted or unsubstituted phenyl group include phenyl groups that may be substituted with one or two groups selected from a hydroxyl group, a halogen atom, a lower alkoxy group, a lower alkenyl group, a methylsulfonyloxy group, a substituted or unsubstituted lower alkyl group, a substituted or unsubstituted amino group, a substituted or unsubstituted phenyl group, a substituted or unsubstituted phenoxy group and a substituted or unsubstituted pyridyl group.

In addition, the anion of the ionic liquid is applicable as long as the anion of the ionic liquid is a non-carboxylate anion of which the conjugate acid has a pKa of 4 or higher in vacuum and preferably within a range of 4 to 10. Examples thereof include ions of a substituted or unsubstituted phenolate, a substituted or unsubstituted pyridinolate (pyridonate), a substituted or unsubstituted pyrimidinolate (pyrimidonate), substituted or unsubstituted 2,6-dioxo-1,2,3,6-tetrahydropurin-7-ide, substituted or unsubstituted imidazol-1-ide and 1,1,1,3,3,3-hexafluoro-2-(trifluoromethyl)propan-2-olate, a cyanide ion (CN⁻), a fluoride ion (F⁻) and the like. Any one of these anions may be used singly or two or more thereof may be used in combination. A substituent in the substituted anion can be an alkyl group having 1 to 18 carbon atoms, an alkoxy group having 1 to 18 carbon atoms, a fluoroalkyl group having 1 to 18 carbon atoms, a halogen or the like, and one to five hydrogen atoms in the anion structure can be replaced. Anions of strong acids such as halogen anions other than a fluoride ion such as a chloride ion (Cl⁻), an iodine ion (I⁻) and a bromide ion (Br⁻), a sulfate anion and a phosphate anion are inappropriate since the pKa of the conjugate acid in vacuum is lower than 4.

Examples of the anion of the ionic liquid that is preferably used in the production method according to the present embodiment include the following anions, but the anion of the ionic liquid is not limited thereto. The names of the following anions are as described below.

(1) Phenolate, (2) 4-chlorophenolate, (3) 4-(trifluoromethyl)phenolate, (4) 2,3,4,5,6-pentafluorophenolate, (5) pyridin-2-olate, (6) pyridin-3-olate, (7) pyridin-4-olate, (8) 4,6-dimethylpyrimidin-2-olate, (9) 4-methoxyphenolate, (10) 1,3-dimethyl-2,6-dioxo-1,2,3,6-tetrahydropurin-7-ide, (11) imidazol-1-ide, (12) 1,1,1,3,3,3-hexafluoro-2-(trifluoromethyl)propan-2-olate.

[Formula 5]

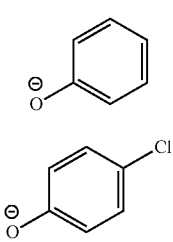

(1)

(2)

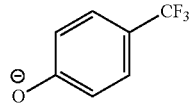

(3)

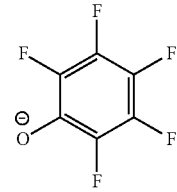

(54)

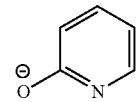

(5)

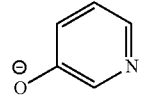

(6)

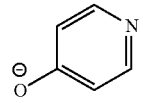

(7)

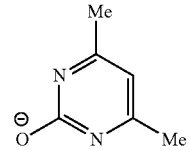

(8)

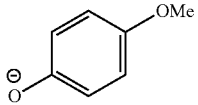

(9)

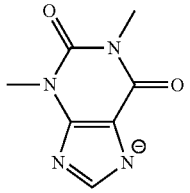

(10)

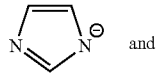

and (11)

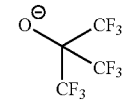

(12)

The raw material including the polysaccharide is dissolved in the ionic liquid and reacted with an acyl group donor, whereby the ionic liquid also functions as a catalyst and the derivatization of the polysaccharide progresses. That is, a hydrogen atom in a hydroxy group of the polysaccharide is replaced with an acyl group of the acyl group donor, whereby a polysaccharide ester is formed. As a specific example, a reaction formula by which cellulose and a vinyl ester are reacted in an ionic liquid in which a cation is a 1-ethyl-3-methylimidazolium ion to produce a cellulose ester will be shown below. In the formula, X' is a non-carboxylate anion of which the conjugate acid has a pKa of 4 or higher in vacuum.

[Formula 6]

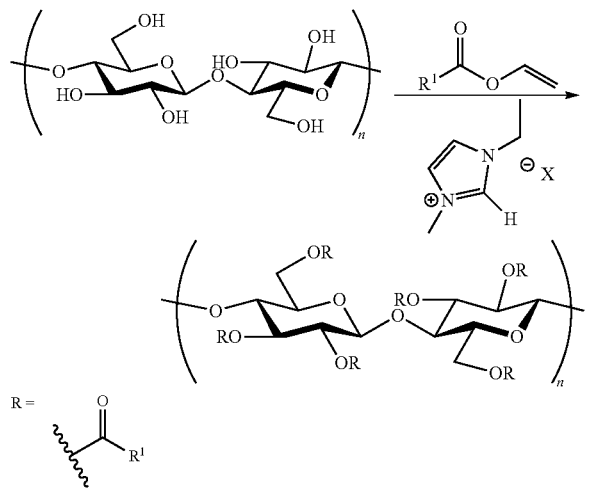

The concentration of the raw material including the polysaccharide in the ionic liquid as a solvent varies depending on the type or molecular weight of the polysaccharide and is not particularly limited. Typically, the weight of the ionic liquid is preferably set at twice or more the weight of the polysaccharide, and specifically, the concentration of the polysaccharide in the ionic liquid is preferably set at 5 wt % to 20 wt %.

In addition, the ionic liquid can be used as a co-solvent system with an organic solvent. Even in this case, the weight of the ionic liquid is preferably set at twice or more the weight of the polysaccharide. Within the range of this condition, the amount of the ionic liquid used can be reduced, and it becomes possible to suppress the production cost of a polysaccharide derivative by replacing the reduced amount of the ionic liquid with the organic solvent.

In the case of using the ionic liquid as a co-solvent, the organic solvent can be appropriately selected from a variety of organic solvents in consideration of the solubility with respect to a polysaccharide derivative to be generated or the like under the condition that the organic solvent does not react with the ionic liquid. Specific examples thereof include acetonitrile, tetrahydrofuran (THF), dimethylformamide (DMF), dimethylacetamide (DMAc), dimethyl sulfoxide (DMSO), 1,3-dioxolane, 1,4-dioxane and the like. Chloroform reacts with some of the ionic liquid and is thus not applicable in many cases, but is not excluded from the scope of the present invention. In addition, in a case where, as the polysaccharide derivative, cellulose butyrate is produced, tetrahydrofuran (THF) is preferably used, and, in a case where cellulose acetate is produced, dimethyl sulfoxide (DMSO), 1,3-dioxolane or the like is preferably used, but the organic solvent is not limited thereto.

Any acyl group donor is applicable as long as the acyl group donor is a compound capable of reacting with a hydroxy group in the polysaccharide and replacing a hydrogen atom with an acyl group and can be appropriately selected depending on the structure of an intended polysaccharide derivative. Examples thereof include a chain or cyclic ester, an aldehyde, a carboxylic acid halide or a carboxylic acid anhydride. Any one of these acyl group donors may be used singly or two or more thereof may be used in combination. When two or more acyl group donors are reacted, it is possible to introduce different substituents into one molecule of the polysaccharide.

Examples of the chain ester compound include one or more compounds selected from an isopropenyl carboxylate such as isopropenyl acetate, a carboxylic acid ester such as vinyl carboxylate or methyl carboxylate and the like. Intrinsically, carboxylic acid esters have been known as very stable chemical substances unlike carboxylic anhydrides or the like. Therefore, it was essential to separately use a catalyst in order to cause an ester exchange reaction. In the present embodiment, since the ionic liquid, which is the solvent, is also used as the catalyst, it is possible to derivatize the polysaccharide by an ester exchange reaction without separately adding a catalyst. In addition, examples of the cyclic ester compound include one or more compounds selected from a branched or unbranched lactone such as δ-valerolactone, γ-butyrolactone, ε-caprolactone, cyclopentadecanolide or cyclohexadecanolide and a cyclic ester compound in which part or all of the ring structure of α-pyrone, coumarin or the like is an aromatic ring.

The aldehyde can be appropriately selected from a variety of known aldehydes in the prior art depending on the type of a polysaccharide derivative (esterified polysaccharide) that is a production target and used. Specific examples thereof include saturated aliphatic aldehydes such as acetaldehyde, propylaldehyde, hexanal, heptanal, octanal, nonanal, decanal, undecanal and dodecanal; unsaturated aliphatic aldehydes such as acrolein, metacrolein, cis-3-hexenal, trans-2-hexenal, trans-2-heptenal, cis-4-heptenal, trans-4-heptenal, trans-2-octenal, trans-2-nonenal, cis-6-nonenal, trans-2-decenal, cis-4-decenal, trans-4-decenal, 7-undecenal, 9-undecenal, 10-undecenal and citronellal; heterocyclic aldehydes such as furfural; aromatic aldehydes such as benzaldehyde, naphthaldehyde, anthraldehyde, cuminaldehyde and anisaldehyde; and the like, but the aldehyde is not limited thereto. In addition, α,β-unsaturated aldehydes such as cinnamaldehyde, hexyl cinnamaldehyde, citral, sinapaldehyde, perillaldehyde, myrtenal, leaf aldehyde and coniferyl aldehyde are also preferably used.

Examples of the carboxylic acid halide include an aliphatic carboxylic acid halide, an alicyclic carboxylic acid halide, an aromatic carboxylic acid halide and the like. In addition, examples of the halide include fluoride, chloride, bromide and iodide. As the aliphatic carboxylic acid halide, any halide of carboxylic acid having a saturated or unsaturated aliphatic hydrocarbon group is applicable, and specific examples thereof include acetyl fluoride, acetyl chloride, acetyl bromide, acetyl iodide, propionyl fluoride, propionyl chloride, propionyl bromide, propionyl iodide, butyryl fluoride, butyryl chloride, butyryl bromide, butyryl iodide and the like. The alicyclic carboxylic acid halide is not particularly limited as long as the alicyclic carboxylic acid halide is a halide of a carboxylic acid having a saturated or unsaturated alicyclic hydrocarbon group, and examples thereof include cyclohexanecarbonyl chloride, cyclohexenecarbonyl chloride and the like. In addition, the aromatic carboxylic acid halide is not particularly limited as long as the aromatic carboxylic acid halide is a halide of a carboxylic acid having an aromatic hydrocarbon group, and examples thereof include benzoyl fluoride, benzoyl chloride, benzoyl bromide, benzoyl iodide and the like.

In addition, examples of the carboxylic acid anhydride include an aliphatic carboxylic acid anhydride, an alicyclic carboxylic acid anhydride, an aromatic carboxylic acid anhydride and the like. The aliphatic carboxylic acid anhydride is not particularly limited as long as the aliphatic carboxylic acid anhydride is an anhydride of a carboxylic acid having a saturated or unsaturated aliphatic hydrocarbon group, and examples thereof include acetic anhydride, propionic anhydride, butyric anhydride, pentanoic anhydride, hexanoic anhydride, heptanoic anhydride, octanoic anhydride, nonanoic anhydride, decanoic anhydride, lauric anhydride, myristic anhydride, palmitic anhydride, stearic anhydride, maleic anhydride, succinic anhydride and the like. In addition, any alicyclic carboxylic acid anhydride is applicable as long as the alicyclic carboxylic acid anhydride is an anhydride of a carboxylic acid having a saturated or unsaturated alicyclic hydrocarbon group, and specific examples thereof include cyclohexanedicarboxylic acid anhydride, cyclohexenedicarboxylic acid anhydride, bis(cyclopentanecarboxylic acid) anhydride, bis(cyclohexanecarboxylic acid) anhydride, bis(adamantancarboxylic acid) anhydride, bis(norbomancarboxylic acid) anhydride and the like. The aromatic carboxylic acid anhydride needs to be an anhydride of a carboxylic acid having an aromatic hydrocarbon group, and examples thereof include benzoic anhydride, phthalic anhydride, a derivative thereof and the like.

The amount of the acyl group donor that is reacted with the polysaccharide varies depending on the types or the like of the polysaccharide and the acyl group donor, and, for example, 0.3 to 2.0 equivalents of the acyl group donor is preferably reacted with respect to 1 equivalent of the hydroxy group of the polysaccharide. In addition, the reaction conditions need to be conditions under which the ionic liquid functions as a catalyst and the reaction progresses, and the reaction can be carried out by, for example, stirring a mixture of the raw material including the polysaccharide, the ionic liquid and the acyl group donor at 25° C. to 80° C. for one to 48 hours. On a solution after the reaction, reprecipitation using a solvent such as methanol, filtration and the like are carried out, whereby a predetermined polysaccharide derivative can be obtained. In addition, the ionic liquid used in the reaction can be recovered and reused.

In a case where an aldehyde is used as the acyl group donor, the reaction is preferably carried out in the presence of an oxidant such as an inorganic oxidant such as oxygen (oxygen in the air), manganese dioxide or hydrogen peroxide or an organic oxidant such as azobenzene. Here, an α,β-unsaturated aldehyde has a double bond having a high oxidation degree in the molecule, and the aldehyde itself functions as an oxidant. Therefore, a polysaccharide derivative (esterified polysaccharide) can be obtained simply by mixing the polysaccharide and the aldehyde in the ionic liquid without using an external oxidant such as oxygen. In this case, in a polysaccharide derivative to be produced, the double bond in the α,β-unsaturated aldehyde is introduced into the structure in a reduced state.

The produced polysaccharide derivative can be converted to a different polysaccharide derivative for the purpose of reforming or the like by a method of the prior art in which a base such as NaOH or an acid catalyst such as sulfuric acid is used or by, subsequently, further reacting the produced polysaccharide derivative with a variety of reagents such as an acyl group donor in the presence of the ionic liquid in the present embodiment.

Next, as another embodiment, a method for producing a lignin derivative will be described. This production method includes a step of dissolving a raw material including lignin in at least one ionic liquid having an anion which is a non-carboxylate anion and reacting the raw material with an acyl group donor, a conjugate acid of the anion having a pKa of 4 or higher in vacuum. The reaction is carried out according to the above-described method for producing a polysaccharide derivative except that the raw material including lignin is used instead of the raw material including the polysaccharide, whereby a lignin derivative corresponding to the structure of the acyl group donor being applied can be obtained. As a specific example, a reaction formula by which lignin and a vinyl ester are reacted in an ionic liquid in which a cation is a 1-ethyl-3-methylimidazolium ion to produce a lignin ester will be shown below. In the formula, X' is a non-carboxylate anion of which the conjugate acid has a pKa of 4 or higher in vacuum. This esterified substance of lignin can be preferably used as a flame retardant or the like. At this time, a hydroxy group bonded to aromatic carbon and a hydroxy group bonded to aliphatic carbon are present in the lignin molecule, and, according to the present embodiment, substitution can occur on any of the hydroxy groups. Similar to the above-described method for producing a polysaccharide derivative, a predetermined ionic liquid serves not only as a solvent but also as a catalyst, and the esterified substance of lignin is generated.

[Formula 7]

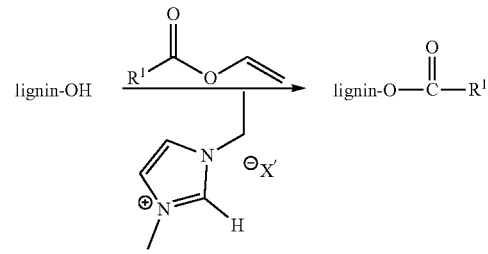

The lignin in the raw material can be appropriately selected from a variety of known natural lignin of the prior art and isolated lignin and used. Examples thereof include natural lignin such as coniferous lignin, broadleaf lignin and graminoid lignin, lignosulfonic acid that is obtained in a large amount from pulping waste liquid of chemical pulping in paper pulp manufacturing processes, alkaline lignin such as kraft lignin and soda lignin and isolated lignin (industrial lignin) such as soda-anthraquinone lignin, organosolv lignin and exploded lignin. Any one of the lignin may be used or two or more thereof may be jointly used.

In the method for producing a lignin derivative of the present embodiment, the type of the ionic liquid, the type of the acyl group donor, and reaction conditions that are applicable are the same as those in the case of the above-described method for producing a polysaccharide derivative.

The produced lignin derivative can be converted to a different lignin derivative for the purpose of reforming or the like by a method of the prior art in which a base such as NaOH or an acid catalyst such as sulfuric acid is used or by, subsequently, further reacting the produced polysaccharide derivative with a variety of reagents such as an acyl group donor in the presence of the ionic liquid in the present embodiment.

EXAMPLES

Next, the present invention will be described in more detail with examples, but the present invention is not limited to these examples.

Example 1

1) Synthesis of Ionic Liquid Precursor

A suspension obtained by mixing a solution mixture of 1-ethyl-3-methylimidazolium chloride (30 g, 250 mmol) and 2-propanol (270 mL) and a solution mixture of potassium hydroxide (15 g, 270 mmol) and 2-propanol (750 mL) at −60° C. was filtered at reduced pressure and room temperature, and the obtained filtrate was filtered at −60° C., thereby obtaining a 2-propanol solution of 1-ethyl-3-methylimidazolium hydroxide. The concentration of the 2-propanol solution of 1-ethyl-3-methylimidazolium hydroxide was obtained by a neutralization titration experiment in which benzoic acid was used as an acid component and a phenolphthalein solution was used as a color indicator.

2) Synthesis of Ionic Liquid

A 0.205 M 2-propanol solution of 1-ethyl-3-methylimidazolium hydroxide (50 mL, 10.1 mmol) having a clarified concentration and a solution obtained by dissolving an equimolar amount of 2-pyridone (0.96 g, 10.1 mmol) in 2-propanol (100 mL) were mixed, stirred for one hour, and then filtered, and the filtrate was distilled away at reduced pressure. The mixture was dried in vacuum for one night, thereby quantitatively obtaining 1-ethyl-3-methylimidazolium 2-pyridonate (Emim2OPy) (2.07 g, 10.1 mmol).

$^1$H NMR (600 MHz, DMSO-$d_6$) δ; 10.44 (s, 1H), 7.89 (s, 1H), 7.78-7.76 (m, 1H), 7.62 (q, J=2.3 Hz, 1H), 6.99-6.96 (m, 1H), 5.88-5.84 (m, 2H), 4.19 (q, J=7.3 Hz, 2H), 3.85 (s, 3H), 1.34-1.29 (m, 3H). $^{13}$C NMR (150 MHz, DMSO-$d_6$) δ; 172.0, 146.9, 138.3, 137.0, 124.0, 122.4, 114.9, 104.7, 44.4, 36.0, 15.8.

3) Synthesis of Cellulose Ester Using Ionic Liquid (Emim2OPy) and Vinyl Ester Cellulose (240 mg, 4.44 mmol=[OH]) was dissolved in the 1-ethyl-3-methylimidazolium 2-pyridonate (Emim2OPy) (456 fmg, 4.44 mmol) in a 20 mL Schlenk tube and dried at reduced pressure and 80° C. for three hours. A balloon filled with argon gas was attached to a reaction container, the inside of the container was purged with argon, dehydrated DMSO (5.2 mL, 142 mmol) was added thereto, whether or not the cellulose was uniformly dissolved in the solution was confirmed, and vinyl pivalate (10.5 mL, 71.6 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (220 mg). From the analysis results of IR and $^1$H NMR measurements, it was confirmed that the recovered substance was an intended cellulose pivalate ester. The degree of substitution was 3.0.

IR (ATR, cm$^{-1}$) 1730.; $^1$H NMR (600 MHz, CDCl$_3$) δ; 5.5-3.0 (br), 1.3-0.9 (br).

(Example 2) Synthesis of Cellulose Ester Using Ionic Liquid (Emim4,6OPym) and Vinyl Ester Cellulose (120 mg, 2.22 mmol=[OH]) was dissolved in 1-ethyl-3-methylimidazolium 4,6-dimethyl-2-pyrimidonate (Emim4,6OPym) (268 mg, 2.22 mmol) in a 20 mL Schlenk tube and dried at reduced pressure and 80° C. for three hours. A balloon filled with argon gas was attached to a reaction container, the inside of the container was purged with argon, dehydrated DMSO (2.6 mL, 71 mmol) was added thereto, whether or not the cellulose was uniformly dissolved in the solution was confirmed, and vinyl pivalate (5.25 mL, 35.8 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (110 mg). From the analysis results of IR and $^1$H NMR measurements, it was confirmed that the recovered substance was an intended cellulose pivalate ester. The degree of substitution was 2.8.

IR (ATR, cm$^{-1}$) 1730.; $^1$H NMR (600 MHz, CDCl$_3$) δ; 5.5-3.0 (br), 1.3-0.9 (br).

(Example 3) Synthesis of Cellulose Ester Using Ionic Liquid (Emim2OPy) and Cinnamaldehyde Cellulose (120 mg, 2.22 mmol=[OH]) was dissolved in 1-ethyl-3-methylimidazolium 2-pyridonate (Emim2OPy) (456 mg, 2.22 mmol) in a 20 mL Schlenk tube and dried at reduced pressure and 80° C. for three hours. A balloon filled with argon gas was attached to a reaction container, the inside of the container was purged with argon, and dehydrated DMSO (3.15 mL, 44.4 mmol) was added thereto and stirred at 60° C. for three hours. After the stirring, whether or not the cellulose was uniformly dissolved in the solution was confirmed, cinnamaldehyde (587 mg, 4.44 mmol) was added into a reaction solution and stirred at 60° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (220 mg). From the analysis results of IR and $^1$H NMR measurements, it was confirmed that the recovered substance was an intended cellulose phenylpropionate ester. The degree of substitution was 3.0.

IR (ATR, cm$^{-1}$) 1729.; $^1$H NMR (600 MHz, Acetone-$d_6$) δ; 8.0-6.5 (br), 5.5-3.0 (br), 3.0-2.5 (br).

(Example 4) Synthesis of Cellulose Ester Using Ionic Liquid (Emim2OPy) and Benzaldehyde Cellulose (120 mg, 2.22 mmol=[OH]) was dissolved in Emim2OPy (456 mg, 2.22 mmol) in a 20 mL Schlenk tube and dried at reduced pressure and 80° C. for three hours. A balloon filled with an air on which a drying treatment had been carried out was attached to a reaction container, the inside of the container was purged with the air, and dehydrated DMSO (3.15 mL, 44.4 mmol) was added thereto and stirred at 60° C. for three hours. After the stirring, whether or not the cellulose was uniformly dissolved in the solution was confirmed, benzaldehyde (226 μL, 2.22 mmol) was added into a reaction solution and stirred at 60° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (118 mg).

From the analysis results of IR and $^1$H NMR measurements, it was confirmed that the recovered substance was an intended cellulose benzoate ester. The degree of substitution was 1.4.

IR (ATR, cm$^{-1}$) 1714.; $^1$H NMR (600 MHz, Acetone-d$_6$) δ; 8.3-6.9 (br), 5.8-3.0 (br).

(Example 5) Synthesis of Cellulose Ester Using Ionic Liquid (Emim3OPy) and Vinyl Pivalate Cellulose (120 mg, 2.22 mmol=[OH]) was dissolved in 1-ethyl-3-methylimidazolium pyridin-3-olate (Emim3OPy) (456 mg, 2.22 mmol) in a 20 mL Schlenk tube and dried at reduced pressure and 80° C. for three hours. A balloon filled with argon gas was attached to a reaction container, the inside of the container was purged with argon, dehydrated DMSO (2.6 mL, 71 mmol) was added thereto, whether or not the cellulose was uniformly dissolved in the solution was confirmed, and vinyl pivalate (5.25 mL, 35.8 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (110 mg). From the analysis results of IR and $^1$H NMR measurements, it was confirmed that the recovered substance was an intended cellulose pivalate ester. The degree of substitution was 2.9.

IR (ATR, cm$^{-1}$) 1730.; $^1$H NMR (600 MHz, CDCl$_3$) δ; 5.5-3.0 (br), 1.3-0.9 (br).

(Example 6) Synthesis of Cellulose Ester Using Ionic Liquid (Emim4OPy) and Vinyl Pivalate Cellulose (120 mg, 2.22 mmol=[OH]) was dissolved in 1-ethyl-3-methylimidazolium pyridin-4-olate (Emim4OPy) (456 mg, 2.22 mmol) in a 20 mL Schlenk tube and dried at reduced pressure and 80° C. for three hours. A balloon filled with argon gas was attached to a reaction container, the inside of the container was purged with argon, dehydrated DMSO (2.6 mL, 71 mmol) was added thereto, whether or not the cellulose was uniformly dissolved in the solution was confirmed, and vinyl pivalate (5.25 mL, 35.8 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (110 mg). From the analysis results of IR and $^1$H NMR measurements, it was confirmed that the recovered substance was an intended cellulose pivalate ester. The degree of substitution was 2.7.

IR (ATR, cm$^{-1}$) 1730.; $^1$H NMR (600 MHz, CDCl$_3$) δ; 5.5-3.0 (br), 1.3-0.9 (br).

(Example 7) Synthesis of Cellulose Ester Using Ionic Liquid (EmimPri) and Vinyl Pivalate Cellulose (120 mg, 2.22 mmol=[OH]) was dissolved in 1-ethyl-3-methylimidazolium 1,3-dimethyl-2,6-dioxo-1,2,3,6-tetrahydropurin-7-ide (EmimPri) (664 mg, 2.22 mmol) in a 20 mL Schlenk tube and dried at reduced pressure and 80° C. for three hours. A balloon filled with argon gas was attached to a reaction container, the inside of the container was purged with argon, dehydrated DMSO (2.6 mL, 71 mmol) was added thereto, whether or not the cellulose was uniformly dissolved in the solution was confirmed, and vinyl pivalate (5.25 mL, 35.8 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (110 mg). From the analysis results of IR and $^1$H NMR measurements, it was confirmed that the recovered substance was an intended cellulose pivalate ester. The degree of substitution was 2.7.

IR (ATR, cm$^{-1}$) 1730.; $^1$H NMR (600 MHz, CDCl$_3$) δ; 5.5-3.0 (br), 1.3-0.9 (br).

(Example 8) Synthesis of Cellulose Ester Using Ionic Liquid (Emim2OPy) and Vinyl Laurate Cellulose (120 mg, 2.22 mmol=[OH]) was dissolved in 1-ethyl-3-methylimidazolium pyridin-2-olate (Emim2OPy) (456 mg, 2.22 mmol) in a 20 mL Schlenk tube and dried at reduced pressure and 80° C. for three hours. A balloon filled with argon gas was attached to a reaction container, the inside of the container was purged with argon, dehydrated DMSO (2.6 mL, 71 mmol) was added thereto, whether or not the cellulose was uniformly dissolved in the solution was confirmed, and vinyl laurate (8.05 mL, 35.8 mmol) was added into a reaction solution and stirred at 80° C. for 24 hours. The reaction solution was added to an excessive amount of methanol to precipitate an undissolved component, and the undissolved component was filtered, then, further washed using methanol, and then recovered. The undissolved component was dried at 60° C. under reduced pressure for one night, thereby obtaining a solid (110 mg). From the analysis results of IR and $^1$H NMR measurements, it was confirmed that the recovered substance was an intended cellulose laurate ester. The degree of substitution was 3.0.

IR (ATR, cm$^{-1}$) 1750.; $^1$H NMR (600 MHz, CDCl$_3$) δ; 5.5-3.0 (br), 2.5-0.8 (br).

All of the publication, patents, and patent applications cited in the present specification are incorporated as they are into the present specification by reference.

The invention claimed is:

1. A method for producing a polysaccharide derivative comprising:
    dissolving a raw material comprising a polysaccharide in an ionic liquid having an anion which is a non-carboxylate anion, wherein a conjugate acid of the non-carboxylate anion has a pKa of 4 or higher in vacuum, and reacting the raw material with an acyl group donor, wherein the anion is selected from the group consisting of a substituted or unsubstituted phenolate, a substituted or unsubstituted pyridinolate, a substituted or unsubstituted pyrimidinolate, a substituted or unsubstituted 2,6-dioxo-1,2,3,6-tetrahydropurin-7-ide, and a substituted or unsubstituted imidazol-1-ide.

2. The method according to claim 1, wherein the anion is selected from the group consisting of the following formulae:

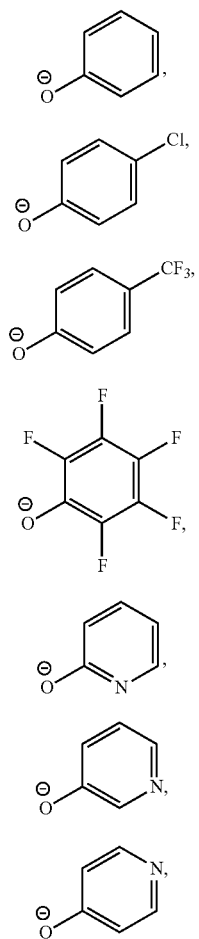
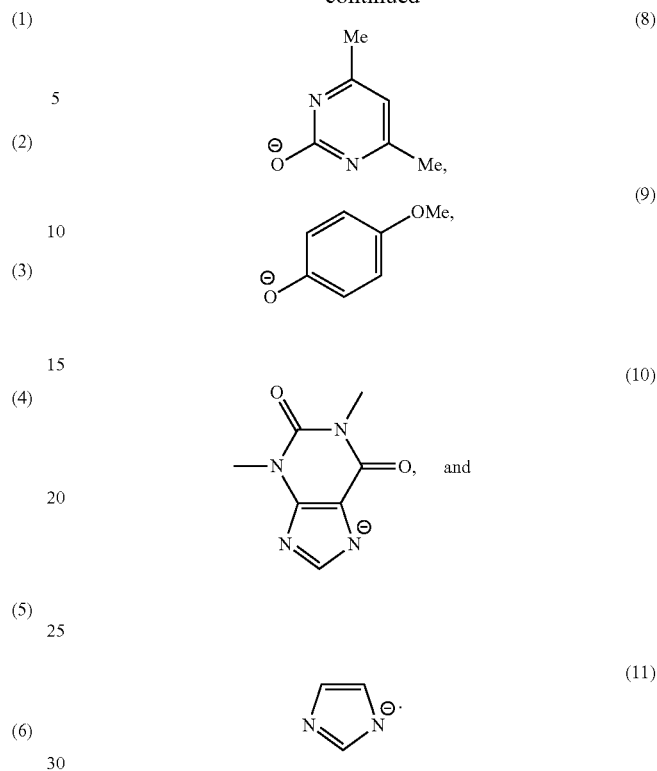
3. The method according to claim 1, wherein the polysaccharide is cellulose.
4. The method according to claim 1, wherein the acyl group donor is a chain or cyclic ester, an aldehyde, a carboxylic acid halide or a carboxylic acid anhydride.
* * * * *